Oct. 11, 1966 B. G. HURD ET AL 3,278,233
IN SITU LEACHING OF SUBTERRANEAN DEPOSITS
Filed March 27, 1964
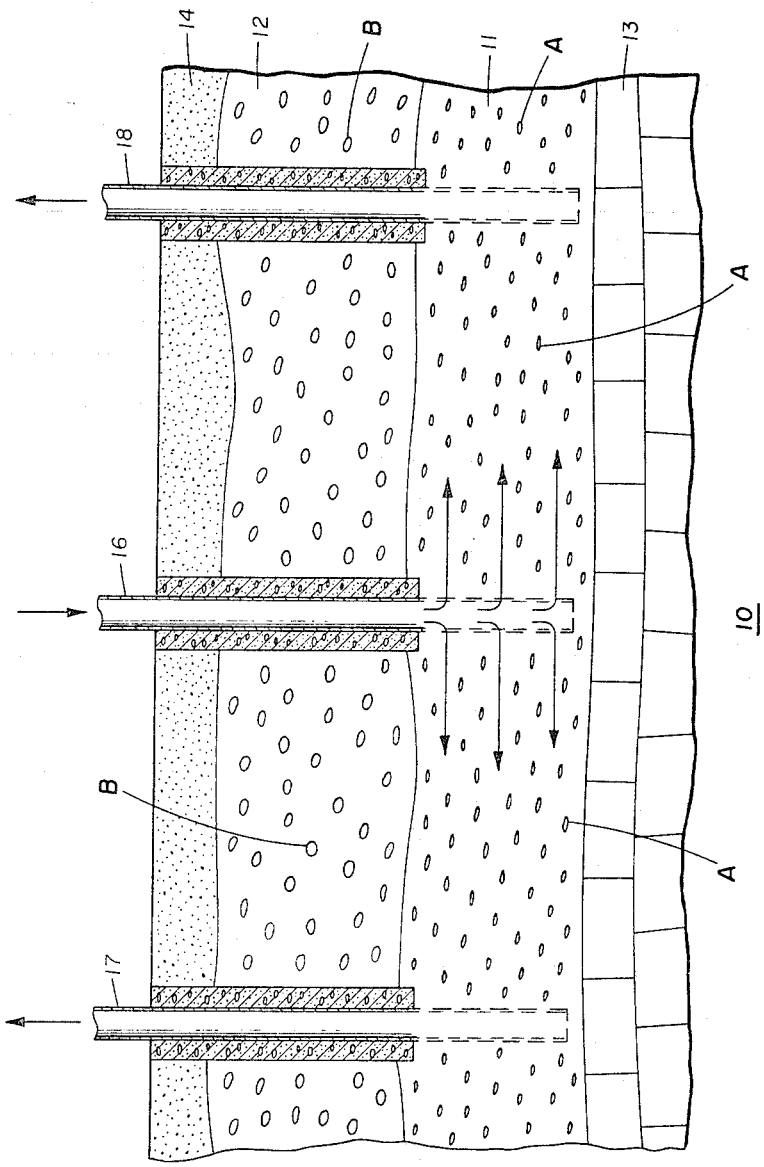
BILLY GEORGE HURD
JOHN L. FITCH
INVENTORS
BY Emil J. Bednar
ATTORNEY United States Patent Office 3,278,233
Patented Oct. 11, 1966

3,278,233
IN SITU LEACHING OF SUBTERRANEAN DEPOSITS
Billy George Hurd and John L. Fitch, Dallas, Tex., assignors to Mobil Oil Corporation, a corporation of New York
Filed Mar. 27, 1964, Ser. No. 355,217
23 Claims. (Cl. 299—4)

This invention relates to a method for leaching subterranean mineral deposits in the earth. More particularly, it relates to a method for the leaching of substances that form solutions with in situ-produced aqueous solubilizers from subterranean mineral deposits.

There are mineral deposits which cannot be subjected to a conventional mining method for the recovery of their more valuable constituents within economic feasibility. An example of such deposits is the vast Bone Valley Formation in Florida. This formation is rich in phosphates and is of shallow occurrence. However, conventional mining procedures, for economic reasons, cannot be employed to recover the phosphates from a large portion of this deposit. One reason for this result is the excessive thickness of the overburden overlying the deposit. Another reason is that the deposit is low in grade. Both the overburden and low grade conditions in the deposit increase to uneconomic magnitudes the cost and difficulty of recovering the desired phosphates.

In situ leaching methods of recover values from such mineral deposits have been proposed as alternatives to the mining procedures. For example, it has been proposed to pass an aqueous leaching acid, such as sulfurous or sulfuric acid, through the mineral deposit in liquid phase to form solutions miscible with water from acid solubilized substances. Thereafter, the solutions are to be removed from the deposit to the earth's surface of recovery of the dissolved substances. A number of problems are present in such method which limit its practical utility. One problem resides in the low traversing rates of liquids in the deposit filled with liquid. This low capacity to liquid flow requires an extended time to contact the acid thoroughly with most of the deposit. It also reduces the amount of the resulting solutions which can be readily recovered from the deposit. Another related problem is that the leaching solubilizers, as liquids, cannot be readily circulated through the mineral deposit. Therefore, portions of the mineral deposit may not be leached or may be leached ineffectively. Also, the leaching solubilizer, as a liquid, tends to bypass extensive portions of the mineral deposit. The primary condition which creates these problems in the relatively low mobility of the leaching solubilizer, as a liquid, in the liquid-filled mineral deposits.

The passage of aqueous leaching acids, as liquids, through mineral deposits gives rise to severe problems caused by precipitation of impermeable plugs in the deposit. Such plugs, when once massively formed, cannot be redissolved practically, and prevent further passage of the leaching acid through the mineral deposit. The passage of aqueous leaching acids in the liquid phase through a permeable deposit inherently creates such plugs. As the aqueous leaching acid, as a liquid, traverses the deposit, transport of substances solubilized by the acid is contingent upon successive solution conditions. A constant solubilization, a precipitation, resolubilization, reprecipitation, etc., occur during the aqueous leaching acid's traversing the deposit. For example, numerous substances, such as iron, aluminum, titanium, etc., are initially solubilized in an aqueous leaching acid—only to be reprecipitated as gelatinous hydrous oxides at another location in the deposit as the acid is depleted. The reprecipitation effect is especially severe at the foremost portion of the leaching acid which traverses the deposit. In addition, when the aqueous leaching acid is sulfuric acid, severe plugging at the foremost portion of the solvent traversing the deposit occurs through precipitation of insoluble sulfates, notable those containing calcium. If the precipitation of calcium sulfate could be controlled, the plugging problem could be reduced. However, during in situ leaching with acidic liquids, the temperature during precipitation, acid strength, and duration of precipitation cannot be controlled. Thus, borderline precipitation conditions exist in the solution formed with the leaching acid. Eventually a condition is reached at which continuous precipitation occurs over a limited area in the deposit. This accumulative precipitation forms a plug in the deposit, which plug is impermeable to the leaching acid. The same circumstances cause other types of massive plugs with other aqueous solubilizers, as will be apparent to those skilled in the chemical arts. The recovery of substances solubilized with aqueous solubilizers from subsurface deposits by in situ leaching appears to be promising economically if the previously mentioned problems relating to the use of liquid solubilizers can be avoided.

It is an object of the present invention to provide a method for recovering substances forming solutions with aqueous solubilizers from subsurface mineral deposits without encountering the heretofore-described problems. Another object is to provide a method for the leaching of inorganic substances solubilized with an in situ-produced aqueous acidic solubilizer from a subsurface mineral deposit. Another further object is the rapid and uniform distribution throughout a subsurface mineral deposit of acidic solubilizers so as to reach with certainty the most remote extremity of such deposit. A further object is to produce in situ an aqueous acidic solubilizer throughout a subterranean mineral deposit to bring solubilizable substances into solution for ready recovery. Yet another object is to provide for recovering substances from subsurface mineral deposits using inexpensive solubilizers and other materials. Another object is the recovery of substances in accordance with the preceding objects which, upon completion, places the deposit in a condition for ready repetition of the steps of the present method should another cycle of operation be desired. Another object is to provide for the recovery of solubilizable substances without forming massive plugs of precipitates. These, and other objects, will be more apparent when read in conjunction with the following description, the appended claims, and the attached drawing of a preferred embodiment wherein there appears a vertical section taken through the earth showing a subsurface mineral deposit containing substances to be leached by the steps of the present method.

The objects of the present invention are obtained by a method of in situ leaching where inorganic substances solubilized by an in place formed aqueous solubilizer are recovered from a subsurface deposit as solutions displaced with water. The in place formed aqueous solubilizer is produced by passing a suitable gas into the deposit containing distributed water. Preferably the gas is acidic in reaction, such as the gas sulfur dioxide. The distributed water may be provided by flooding the deposit with water until it is substantially water-wet where the deposit is not initially water-wet. By "water-wet", as the term is used herein, it is meant that substantially all of the solid surfaces of the deposit are wetted with water. Thereafter, at least a portion of the water in the deposit may be displaced by passing air through the deposit so as to increase the permeability to gas of the water-wetted deposit to provide an oxidizer, or for other reasons.

Various combinations of the steps of passing water, air, and the gas to form in place the aqueous solubilizer, have utility as will be apparent from the following description. Lastly, the solutions are driven from the deposit by passing water therethrough and then recovering the solutions driven from the deposit.

In many cases the location and extent in the earth of a subsurface mineral deposit containing the substances solubilized with aqueous solubilizers will be known. However, in the event that such deposit must be located, any means may be used for this purpose. For example, an earthen formation thought to contain such mineral deposit may be subjected to a geophysical survey. The geophysical survey may be any method for locating a mineral deposit, such as radioactive logs and gravitometer and magnetometer explorations. Also, the metes and bounds of the detected mineral deposit may be determined by this, or other suitable method. The geophysical survey, for the purposes of this description, will be assumed to have been performed upon a portion of the earth 10 and, as shown in the drawing, to disclose a mineral deposit 11 disposed between earthen formations 12 and 13. An overburden 14 may be superimposed up the formation 12. The deposit 11 may be considered as being formed of a permeable matrix of minerals disposed between the formations 12 and 13. The permeability of the deposit 11 may be increased by suitable means, such as hydraulic fracturing. The deposit 11 may have been formed by any geological process. The present invention, as will be apparent, is not limited to any particular type deposit or its location in the earth.

The mineral deposit 11 may contain one or more inorganic substances capable of reacting with aqueous solubilizers to form solutions miscible with water. These substances especially include phosphates, iron, aluminum, titanium, copper, nickel, silver, lead, zinc, uranium, manganese, cobalt, chromium and molybdenum. Other substances soluble in aqueous solubilizers will be apparent to those skilled in the art. By aqueous solubilizers, as the term is used herein, it is meant the aqueous solution formers, such as sulfurous and sulfuric acids, nitrous and nitric acids, and acids containing chlorine. The mentioned substances are readily recognized as acidic aqueous solubilizers which react with the substances previously mentioned to form solutions miscible with water.

More particularly, for illustration the deposit 11 may be a mineral phosphate deposit such as found in Florida. The deposit 11 is a matrix containing apatite, a natural calcium phosphate which usually contains fluorine, (or chlorine, hydroxyl or carbonate substituted therefor), and magnesium, manganese and iron. The apatite may be in nodules A intermixed with gravel sands and clays. The formation 13 is bedrock which usually is composed of clays, limestones, and dolomites. Obviously, the formation 13 is relatively impermeable to fluids. The formation 12 superimposed on the deposit 11 generally consists of a matrix like the deposit 11 but has leached phosphate nodules B, principally aluminum phosphate, intermixed with the clays, etc. The formation 12 may form a relatively impermeable barrier to fluids rising vertically from the deposit 11. Lastly, a layer of quartz sand, or the like, at the surface of the earth 10, provides the overburden 14. Phosphate deposits such as described are not always commercially mined because of the reasons previously mentioned.

At first impression, it may appear that flooding the deposit 11 with an aqueous solubilizer in the liquid phase, such as sulfuric acid, would provide for the recovery of the phosphates and other solubilizable substances by in situ leaching. This is a simple procedure and might be considered workable. However, at the foremost front of the leaching acid traversing the deposit 11, there occurs the precipitation of insoluble calcium sulfate, usually in conjunction with various metallic gelationous hydrous oxides. These precipitates occur across the foremost portion of the leaching acid to create a severe plugging of the deposit 11. Such plugging usually prevents a satisfactory completion to the in situ leaching procedure using liquid acid floods.

The method of this invention utilizes the aqueous solubilizers which have been described for in situ leaching, but in steps by which such solubilizers are formed in situ throughout the deposit 11. The precipitates priorly mentioned will still form. However, they are small in size and substantially uniformly distributed in the deposit 11 so as to prevent creation of any massive barriers.

Referring to the drawing, a description of a preferred embodiment of the method of this invention will now be given. In the drawing, the deposit 11, disposed in the earth 10 between the formations 12 and 13, is placed in fluid communication with suitable spaced-apart wells 16, 17 and 18. The wells 16, 17 and 18 may be provided with the usual apparatus for transmitting fluids between the earth's surface and the deposit 11. Where the deposit 11 is not originally water-wet, or for other reasons hereinafter apparent, the deposit 11 is flooded with water via one or more of the wells 16, 17 and 18 as a first step of the present invention. The desired condition of water-wet is, of course, that the solid surfaces of the deposit 11 are wetted with water. The complete flooding of the deposit 11 with water is of advantage in that the water will leach out water-soluble materials, such as sodium chloride. This increases the flow-carrying capacity of the deposit 11 through the created voids. Additionally, the water, whether connate or deliberately introduced, provides the environment in which to form in situ the aqueous solubilizer.

Where the deposit 11 is flooded with water, the next step of the present method is practiced. The water in the deposit 11 is displaced at least in part through the wells 17 and 18 from the deposit 11 by air injected through well 16 which passes through the deposit 11. The water may be removed from the deposit 11 through the well 16 by the air injected through the wells 17 and 18, if desired. Water removal may be obtained by other means such as pumping. Preferably, the air is passed in sufficient volumes through the deposit 11 to displace substantially all of the water removable by air stripping. The removed water can be reused in repeating the water flooding step of the present method, if desired. This is an advantage in water-scarce locations. Obviously, the permeability to gas of the water-wetted deposit 11 is increased with a portion of the water and water-soluble materials removed. Additionally, the removal of as large a portion of the water as possible from the deposit 11 greatly assists the oxidation capabilities of the injected air on substances to be solubilized more readily by aqueous solubilizers in their oxidized states. One reason is that air is not very soluble in water. Only a small amount of oxidizing air can be dissolved in even a large volume of water. Thus, a small amount of water dispersed over a large surface will bring large amounts of oxidizing air into contact with the substances to be solubilized. Air is, of course, a most inexpensive oxidant without producing objectionable precipitates. Other gases which do not combine with the materials in the deposit 11 to form objectionable precipitates may also be used, if desired.

It will be apparent that the permeability to gas of the deposit 11, and the ease of obtaining fluid flows, is reduced by that condition established by the water filling the porous spaces of the deposit 11. The permeability to gas of the deposit 11 is increased upon the displacement of at least a portion of the water, and water-soluble materials, from the deposit 11, through an increase in pore spaces, channels, and other openings through which gases may more readily flow. Thus, air, or other like gases, may be circulated through the deposit 11 between the wells 16, 17 and 18 to remove the water to an amount limited only by that amount removable by gas stripping.

When a desired permeability to provide ready gas flows in the deposit 11 is obtained, the remaining steps of the present invention may be taken.

The next step comprises the passing into the deposit 11 of a gas forming an aqueous solubilizer capable of placing the substances desired to be recovered from the deposit 11 into solution. In the water-wetted deposit 11, this gas and water produce in place the aqueous solubilizer. Preferably, the gas is acidic in its reactions in the presence of water. This gas can be injected through the well 16 to traverse the deposit 11 until it reaches the other of the wells 17 and 18. The air injection into the deposit 11 may now be terminated or continued as desired. Injecting this gas admixed with the air is the equivalent of injecting solely such gas into the air-stripped deposit 11, and may be so practiced in the present method. The concentration of the gas for forming the aqueous solubilizer is readily controlled by the rate of introduction, mixing it with air, or both. It is envisioned in some cases that this gas may be circulated through the deposit 11 between wells 16, 17 and 18 intermixed with the injected air. Sufficient amounts of this gas should be introduced into the deposit 11 to form in situ the aqueous solubilizer required to solubilize the desired substances in the deposit 11 and an excess amount to compensate for the parasitic consumers of the aqueous solubilizer. The passing of this gas through the water-wetted deposit 11 to form in place the aqueous solubilizer is of great advantage. First, the mobility of a fluid in the gas phase in porous bodies is relatively high. Therefore, the gas will readily penetrate to all extremities of the deposit 11. Thus, the gas is readily made to contact all of the substances in the water-wetted deposit 11. The amount of water remaining in the deposit 11 may be small but has a large surface area so that large amounts of the gas are soluble in such water to produce in place the aqueous solubilizer. The desired substances in the deposit 11 are placed into solution by the in situ produced aqueous solubilizer as it is produced to form the solutions miscible with water. The aqueous solubilizer is replenished as fast as it is expanded by the surrounding gas without hindrance from the solutions formed. The resulting solutions are substantially immobile so that a period of digestion is available, if desired, without loss of these solutions.

An acidic gas disposed in water forms an aqueous acidic solubilizer. For example, sulfur dioxide, hydrogen chloride, nitrogen dioxide and chlorine are well suited as acidic gases for purposes of the present method. Preferably, where the deposit 11 contains phosphate minerals, sulfur dioxide is used as the acidic gas. Sulfur dioxide is readily produced in the field by burning sulfur in air. Sulfur dioxide upon contact with water forms oxy acids of sulfur which includes sulfurous acid, which in the presence of air is at least in part converted to sulfuric acid. These acids are excellent leaching fluids. The oxy acids of sulfur, especially the sulfurous and sulfuric acids, react with the phosphates in the deposit 11 to form solutions miscible with water. The heat generated when the sulfur dioxide dissolves in the water contained in the deposit 11 is advantageous in that it accelerates the reaction between the in situ-formed aqueous acidic solubilizer and the reactable substances, especially phosphates, in the deposit 11. Also, such heat accelerates air oxidation in the deposit 11 more readily to solubilize substances.

If desired, the gas to form in place the aqueous solubilizer, with any air that is admixed, may be recirculated through the deposit 11 until the desired substances to be solubilized have formed water miscible solutions. Thus, for practical purposes, little gas capable of producing the aqueous solubilizer will be lost in this step of the present invention.

In some cases, it may be desirable to remove the previously introduced air from the deposit 11. For this result, only the gas for forming the aqueous solubilizer is injected into the deposit 11 via one of the wells 16, 17, or 18 to displace the air from the deposit 11 via the other of the wells.

It will be apparent that large quantities of the gas, such as sulfur dioxide, for forming in place the aqueous solubilizer, will initially only slightly change the permeability to gas of the deposit 11. One reason is that the precipitation of crystals or gelatinous hydrous oxides occurs uniformly through the deposit 11 at the locations where the precipitatable ions initially reside. The in place formed aqueous solubilizers do not displace such ions before they are precipitated. Thus, such ions are not concentrated by being displaced before precipitating in the deposit 11 as occurs when using a conventional liquid flooding procedure employing aqueous acids. After substantial reaction of substances such as phosphates with the in situ-formed aqueous acidic solubilizer, the permeability to gas of the deposit 11 decreases only slightly because of the finely dispersed solutions formed by such reaction. The solutions are recovered in the next step of the present method from the deposit 11.

Water is injected or flowed through the deposit 11 from one of the wells, such as the well 16, and the solutions driven from the deposit 11 by the water are recovered from the other of the wells, such as the wells 17 and 18. The injected water may contain sufficient of the gas for forming the aqueous solubilizers to insure keeping the substances in solution. Sufficient amounts of this gas may be absorbed from the deposit 11, or they may be added directly to the water being injected where desired. The water miscibly displaces substantially all of the solutions of the substances solubilized by the in situ-formed aqueous solubilizer from the deposit 11. This result is of great advantage in that substantially all of the solution of the solubilized substances can be recovered from the deposit 11. In some cases, it may not be necessary to preserve the substances in solution where there is no precipitation problem during the waterflood. This situation is included within the terminology "containing sufficient acidic gas to preserve the substances in solution in the waterflood." As all of the deposit 11 has been waterflooded by this step, it is apparent that the deposit 11 is again essentially in the same condition as it was after practicing the step of the present method wherein the deposit 11 is flooded with water until it is made water-wet. This is a great advantage in that should it be desired to again in situ leach the deposit 11, only the remaining steps of the present method would need to be repeated. The solutions recovered from the wells can be processed for the leached substances by any suitable means, such as electrolysis. Where the substances are phosphates, evaporation of the recovered solutions provides for their recovery.

Although the present method has been described as being applied particularly to a natural phosphate mineral deposit, it will be apparent that it can be applied to subterranean mineral deposits having various substances capable of reacting with aqueous solubilizers to form solutions miscible with water.

From the foregoing, it will be apparent that the method herein described is well suited to satisfy all of the stated objects of the present invention. Also apparent is that significant advantages can be obtained through the use of an in place formed aqueous solubilizer in the recovery of solubilizable substances from a subterranean deposit by this in situ leaching method. Advantages reside in the increased mobility of injected gases to provide a high efficiency in forming in situ the aqueous solubilizers used for the recovery of the desired substances while not forming precipitate plugging. Various changes and alterations in the steps of the present method can be made by those skilled in the art without departing from the spirit of the invention. It is intended that such changes and alterations be encompassed within the appended claims.

The description of the present method is illustrative and the only limitations to be applied are those recited in the appended claims.

What is claimed is:
1. An in situ leaching method for recovering substances capable of reacting with aqueous acidic solubilizers to form solutions miscible with water from a subsurface mineral deposit, comprising the steps of:
   (a) flooding the deposit with water until its solid surfaces are wetted and its openings are at least in part filled with water,
   (b) passing air through the water-wetted deposit for displacing air-strippable water from the deposit to increase the permeability to gas of the deposit sufficiently to permit a continuous flow of air therethrough,
   (c) passing an acidic gas into the water-wetted deposit to produce in situ an aqueous acidic solubilizer whereby substances capable of reacting with aqueous acidic solubilizers form solutions miscible with water, and
   (d) flowing water into the deposit for the miscible displacement of the solutions from the deposit and recovering the displaced solutions.

2. The method of claim 1 wherein the substances are phosphates and the acidic gas is sulfur dioxide.

3. The method of claim 1 wherein in step (c) a mixture of the acidic gas with air is passed into the water-wetted deposit in sufficient volumes to react with all of the substances reacting with, and any parasitic consumers of, the acidic gas and air that may be present.

4. The method of claim 1 wherein the steps (b) through (d) are repeated at least once.

5. An in situ leaching method for recovering substances capable of reacting with aqueous acidic solubilizers to form solutions that are miscible with water from a subsurface mineral deposit, comprising the steps of:
   (a) flooding the deposit with water until it is substantially water-wet,
   (b) passing air through the water-wetted deposit for displacing air-strippable water from the deposit to increase the permeability to gas of the deposit sufficiently to permit a continuous flow of air therethrough,
   (c) passing a sufficient amount of an acidic gas in admixture with said air into the water-wetted deposit to produce in situ an aqueous acidic solubilizer whereby substances capable of reacting with aqueous acidic solubilizers form solutions miscible with water, and
   (d) flowing into the deposit water containing sufficient acidic gas to preserve the substances in solution for the miscible displacement of such solutions from the deposit and recovering the displaced solutions.

6. The method of claim 5 wherein the mineral deposit contains at least one of the substances selected from the group consisting of phosphates, iron, aluminum, titanium, copper, nickel, silver, lead, zinc, uranium, manganese, cobalt, chromium and molybdenum.

7. The method of claim 5 wherein the acidic gas is sulfur dioxide and the substances are phosphates.

8. The method of claim 5 wherein the acidic gas is selected from the group consisting of sulfur dioxide, hydrogen chloride, chlorine, and nitrogen dioxide.

9. The method of claim 5 wherein the acidic gas and air mixture is recirculated through the water-wetted deposit until all of the substances reacting with, and any parasitic consumers of, the acidic gas and air that may be present have reacted with the acidic gas admixture with air.

10. The method of claim 5 wherein the steps (b) through (d) are repeated at least once.

11. An in situ leaching method for recovering substances capable of reacting with aqueous acidic solubilizers to form solutions from a water-wetted subsurface mineral deposit, comprising the steps of:
   (a) passing air through the deposit for displacing air-strippable water from the deposit to increase the permeability to gas of the deposit sufficiently to permit a continuous flow of air therethrough,
   (b) passing an acidic gas into the water-wetted deposit to produce in situ an aqueous acidic solubilizer whereby substances capable of reacting with aqueous acidic solubilizers form solutions, and
   (c) passing water into the deposit providing a waterflood for moving the solutions from the deposit and recovering the displaced solutions.

12. The method of claim 11 wherein the substances are phosphates, and the acidic gas is sulfur dioxide.

13. The method of claim 11 wherein the mineral deposit contains at least one of the substances selected from the group consisting of phosphates, iron, aluminum, titanium, copper, nickel, silver, lead, zinc, uranium, manganese, cobalt, chromium and molybdenum.

14. The method of claim 11 wherein the acidic gas is selected from the group consisting of sulfur dioxide, hydrogen chloride, chlorine and nitrogen dioxide.

15. The method of claim 11 wherein in step (b) a mixture of the acidic gas with air is passed into the water-wetted deposit in sufficient volumes to react with all of the substances reacting with, and any parasitic consumers of, the acidic gas admixture with air that may be present.

16. The method of claim 11 wherein the steps (a) through (c) are repeated at least once.

17. An in situ leaching method for recovering substances capable of reacting with aqueous acidic solubilizers to form solutions from a water-wetted subsurface mineral deposit, comprising the steps of:
   (a) passing air through the deposit for displacing air-strippable water from the deposit to increase the permeability to gas of the deposit sufficiently to permit a continuous flow of air therethrough,
   (b) passing a sufficient amount of an acidic gas in admixture with air into the water-wetted deposit whereby substances capable of reacting with aqueous acidic solubilizers form solutions, and
   (c) passing water into the deposit to displace the solutions from the deposit, said water containing sufficient acidic gas to preserve the substances in solution during displacement, and recovering the displaced solutions.

18. The method of claim 17 wherein the mineral deposit contains at least one of the substances selected from the group consisting of phosphates, iron, aluminum, titanium, copper, nickel, silver, lead, zinc, uranium, manganese, cobalt, chromium and molybdenum.

19. The method of claim 17 wherein the acidic gas is selected from the group consisting of sulfur dioxide, hydrogen chloride, chlorine, and nitrogen dioxide.

20. The method of claim 17 wherein the acidic gas and air mixture is recirculated through the water-wetted deposit until all of the substances reacting with, and any parasitic consumers of, the acidic gas and air that may be present have reacted wth the acidic gas admixture with air.

21. The method of claim 17 wherein the steps are repeated at least once.

22. An in situ leaching method for recovering inorganic substances from a subsurface mineral deposit, comprising the steps of:
   (a) flooding the mineral deposit with water to make it water-wet,
   (b) passing air through the water-wetted deposit and removing any air-stripped water thereform until the permeability to gas is increased sufficiently to permit a continuous flow of air therethrough,
   (c) passing into the mineral deposit a gas forming in situ an aqueous solubilizer for bringing inorganic substances in the deposit into solution, (d) flowing water through the mineral deposit which has received the gas to drive therefrom the solution formed by the solubilized substance in the deposit with the in situ-formed aqueous solubilizer, said water containing sufficient gas to preserve the substances in solution for the miscible displacement of such solution from the deposit, and (e) recovering the solution driven from the mineral deposit.

23. An in situ leaching method for recovering phosphates from a subsurface mineral phosphate deposit, comprising the steps of:

(a) passing sufficient water into the deposit to make it water-wet, (b) passing air through the water-wetted deposit until the permeability to gas is increased sufficiently to permit a continuous flow of air therethrough, (c) passing sulfur dioxide gas through the water-wetted deposit to form in situ an aqueous acidic solubilizer, (d) flowing water through the deposit to drive therefrom the solutions formed by reaction of the phosphate minerals with the aqueous acidic solubilizer, and (e) recovering the phosphate solutions displaced from the deposit.

References Cited by the Examiner

UNITED STATES PATENTS

| 565,342 | 8/1896 | Frasch | 299—4 |
| 1,690,446 | 11/1928 | Grant et al. | 299—5 X |
| 1,833,682 | 11/1931 | Meyer | 75—101 X |
| 1,843,808 | 2/1932 | Dowsett | 23—55 |
| 2,818,240 | 12/1957 | Livingston | 299—4 |

ERNEST R. PURSER, *Primary Examiner.*

UNITED STATES PATENT OFFICE
CERTIFICATE OF CORRECTION

Patent No. 3,278,233                                            October 11, 1966

Billy George Hurd et al.

It is hereby certified that error appears in the above numbered patent requiring correction and that the said Letters Patent should read as corrected below.

Column 1, line 29, for "of" read -- to --; line 36, for "of" read -- for --; line 51, for "in" read -- is --; line 65, strike out "a"; column 2, line 6, for "notable" read -- notably --; column 3, line 24, for "up" read -- upon --; column 5, line 41, for "expanded" read -- expended --.

Signed and sealed this 5th day of September 1967.

(SEAL)
Attest:

ERNEST W. SWIDER                              EDWARD J. BRENNER
Attesting Officer                           Commissioner of Patents